United States Patent
Rudd et al.

(10) Patent No.: US 6,783,198 B2
(45) Date of Patent: Aug. 31, 2004

(54) DISPLAY CASE

(76) Inventors: Brandon K. Rudd, 2114 Western Ave., Seattle, WA (US) 98121; Marion Lawrence Jovanovich, 4229 W. Marginal Way, Seattle, WA (US) 98106

(*) Notice: Subject to any disclaimer, the term of this patent is extended or adjusted under 35 U.S.C. 154(b) by 140 days.

(21) Appl. No.: 10/114,858

(22) Filed: Apr. 1, 2002

(65) Prior Publication Data

US 2002/0139626 A1 Oct. 3, 2002

Related U.S. Application Data

(60) Provisional application No. 60/281,234, filed on Apr. 2, 2001.

(51) Int. Cl.[7] .............................................. A47B 88/00
(52) U.S. Cl. ................ 312/319.8; 312/7.2; 312/292; 312/310
(58) Field of Search ................ 312/7.2, 194, 196, 312/309, 310, 324, 319.5, 319.6, 319.8, 319.7; 108/25, 26

(56) References Cited

U.S. PATENT DOCUMENTS

| | | | | |
|---|---|---|---|---|
| 3,454,317 A | * | 7/1969 | Salkind | 312/312 |
| 3,572,873 A | * | 3/1971 | Harting, Jr. | 312/7.2 |
| 3,761,152 A | * | 9/1973 | Cory | 312/7.2 |
| 4,515,086 A | * | 5/1985 | Kwiecinski et al. | 108/96 |
| 5,129,611 A | * | 7/1992 | Grover et al. | 312/312 |
| 5,242,217 A | * | 9/1993 | Gonnet | 312/194 |
| 5,273,352 A | * | 12/1993 | Saper | 312/7.2 |
| 5,401,089 A | * | 3/1995 | Inagaki et al. | 312/7.2 |
| 5,680,820 A | * | 10/1997 | Randolph | 108/25 |
| 5,778,800 A | * | 7/1998 | Liang | 108/26 |
| 5,797,666 A | * | 8/1998 | Park | 312/319.5 |
| 6,321,662 B1 | * | 11/2001 | Fraise | 108/25 |
| 6,556,678 B1 | * | 4/2003 | Boyce | 379/454 |

FOREIGN PATENT DOCUMENTS

DE      3132171    * 3/1983     312/7.2

* cited by examiner

*Primary Examiner*—Lanna Mai
*Assistant Examiner*—Hanh V Tran
(74) *Attorney, Agent, or Firm*—Black Lowe & Graham PLLC; Lawrence D. Graham

(57) ABSTRACT

A mobile display case for housing and supporting a display. The display case includes a stand mounted to the interior of the case for a flat panel video or other display. The display stand can be raised to a deployed position or lowered to a stowed position within the case.

12 Claims, 5 Drawing Sheets

DISPLAY CASE

PRIORITY CLAIM

This application claims priority from U.S. Provisional Application No. 60/281,234 filed Apr. 2, 2001.

FIELD OF THE INVENTION

This invention relates generally to cases used for marketing, advertising, and promotional events, particularly including a travel case for housing flat panel displays.

BACKGROUND OF THE INVENTION

Many individuals and companies attend trade shows to introduce new goods, advertise services, or generally offer information to attendees. Similarly, organizations often present information to large audiences at other events such as fairs, open houses, and seminars. The information presented at such events increasingly makes use of multimedia, including audio and video.

Recent advances in flat panel video displays makes such displays a popular choice for the presentation of video information. The video quality of newer flat panel displays is improving such that it rivals the quality of cathode ray tube (CRT) displays. In addition, flat panel displays are typically lighter and are smaller, making them more portable.

Though flat panel displays are more portable than CRTs, they do not sit well on a surface by themselves as with CRTs. Rather, they must be mounted to a wall or attached to a stand before they can be used. Thus, in order to support the display at a remote location, a stand or other mounting equipment must be shipped with the display to the remote location. While this arrangement can produce an acceptable result, it is awkward and cumbersome to package the display and stand or other mount for safe shipment. In addition, it may require a substantial amount of time and effort to assemble the display and stand at the event location, then disassemble and package it for shipping when the event is finished.

Accordingly, there is a need for an integrated display case and mounting system that overcomes some of the above problems.

SUMMARY OF THE INVENTION

The present invention comprises a mobile display system for presenting multi-media content to viewers at tradeshows, fairs, open houses, and other events. The multi-media content can include training, entertainment, advertisements, promotional, or any other information.

In accordance with further aspects of the invention, the system includes a case having an internal lift assembly. A display is mounted to the lift assembly so that the display can be extended out of the case for viewing or retracted within the case for storage or shipment. The display is preferably a flat panel video display, but can alternatively be a white board, bulletin board, projector screen, or any other visual interface device.

In accordance with other aspects of the invention, the lift assembly is a scissor lift assembly attached to an interior surface of the case.

In accordance with still further aspects of the invention, a push button mechanism activates the lift to raise it to desired heights and to collapse the scissor lift assembly for storage within the case.

In accordance with yet other aspects of the invention, the case for storing and shipping the display also serves as a mobile display stand to support the display. In some embodiments, the case includes a wheel mounted to each of the four corners located at the bottom of the case.

In accordance with still another aspect of the invention, some embodiments of the mobile display system include storage space for a variety of multimedia components, including computers, DVD players, sound systems, speakers, video cameras, or other equipment. In addition, it includes space for computers capable of accessing a server on a network to retrieve multi-media content, using either wireless or wired communication channels.

In accordance with still further aspects of the invention, the multi-media content presented may be audio, digital images, text, video or animation.

In accordance with yet another aspect of the invention, the display is a visual display device. Alternatively, the lift assembly can support any other equipment such as speakers, computers, projectors, or other electronic equipment.

As described in greater detail below, the invention provides a mobile display case to allow convenient storage and shipment of a display or other device.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
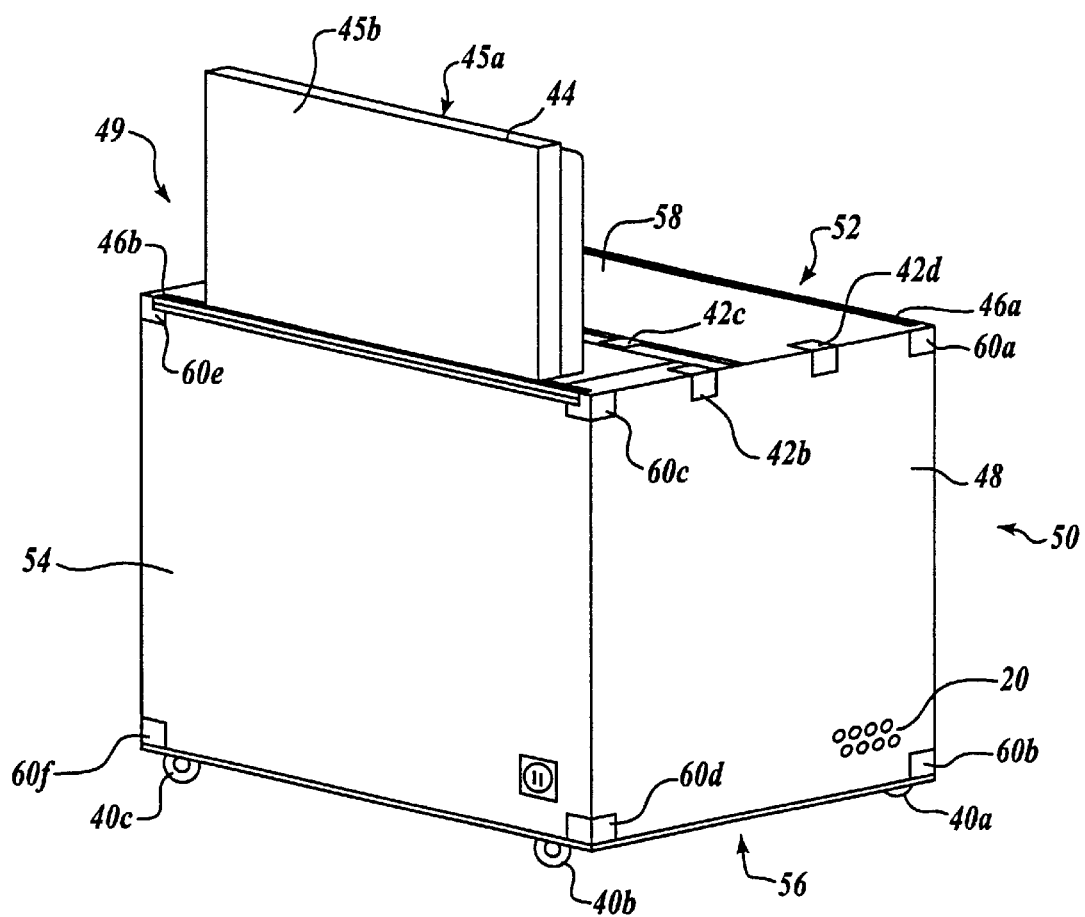
FIG. 1 is a perspective view of a display case with a deployed display screen in accordance with the present invention.
Figure 3:
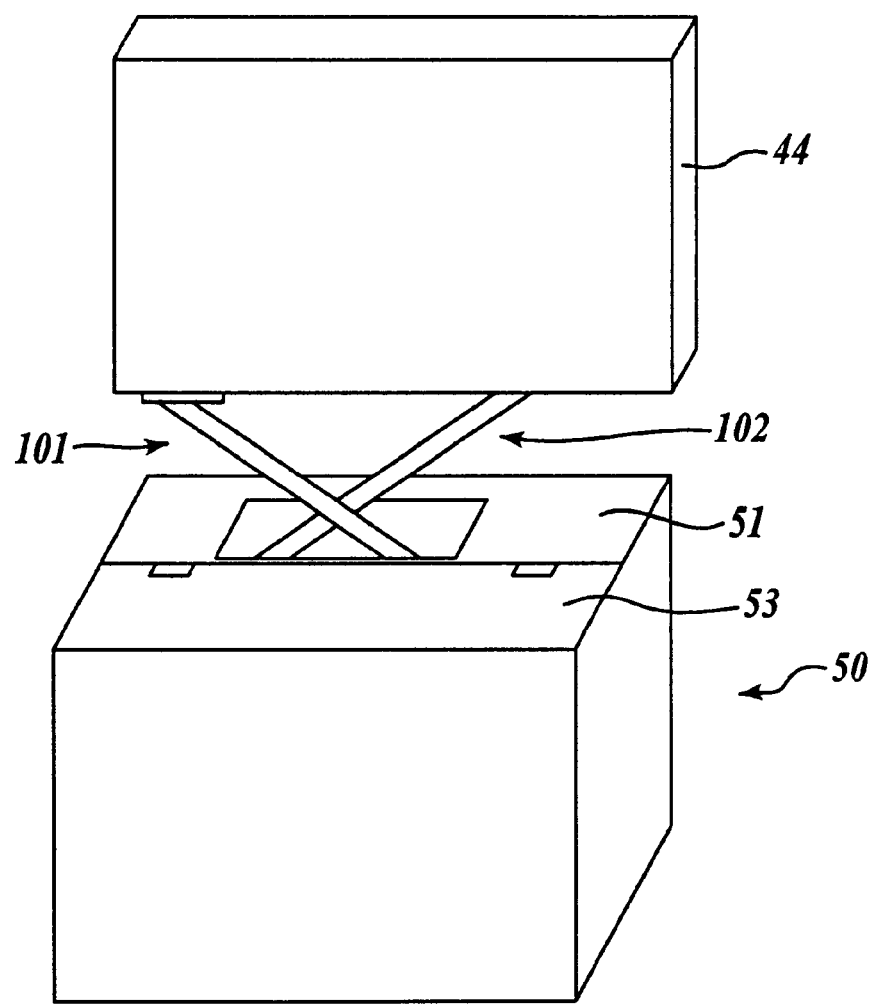
FIG. 3 is a perspective view of a display case including a scissor lift in accordance with a preferred embodiment of the present invention.
Figure 5:
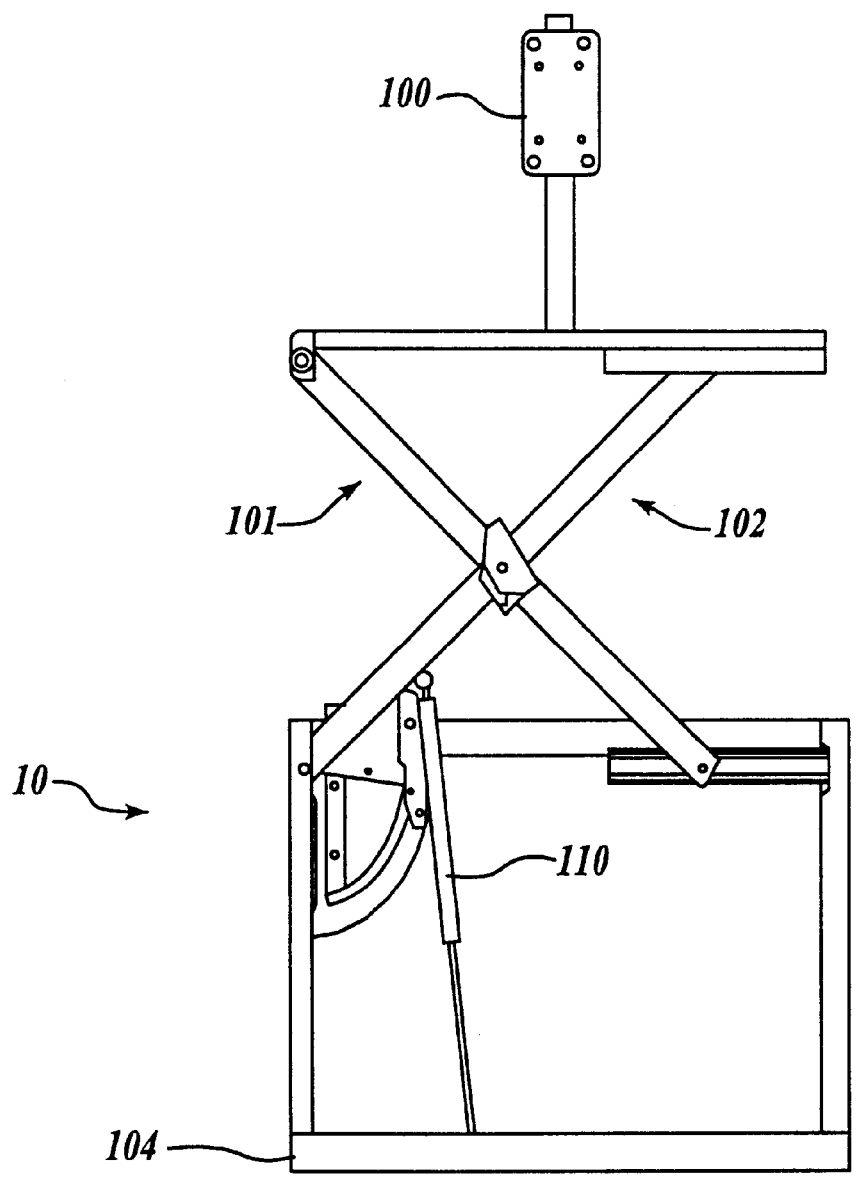
FIG. 5 is a front view of a display stand in accordance with a preferred embodiment of the present invention.

FIG. 1 generally depicts a preferred embodiment of a mobile display system comprised of a case 50, a display 44, and a display lift 10 (best seen in FIGS. 3 and 5).

The Display

The display 44 is a flat panel display having a front side 45a and a back side 45b, the front side having a screen for presenting visual content to an end user. In a preferred embodiment, the display is a plasma monitor capable of presenting digital or analog video, graphic, text, or other images. Alternatively, the display may be an LCD, LED, or other flat panel display. Likewise, a CRT could be used, but is less advantageous because of its size and weight. In yet another alternative, a whiteboard, bulletin board, static display or a projection screen could be employed instead of a video device. In still other embodiments, the display is replaced by audio speakers, a computer, or other components.

Generally, the media content presented on the display consists of audio, text, digital images, video, or animation. Plasma or other flat panel displays are particularly well suited for graphical animation or video presentations, and this invention preferably supports such video content either separately or combined with audio components. Nonetheless, the content can be in the form of a billboard or other static display, or any content that can be presented on a white board or bulletin board.

The Display Case

The display system also includes a case 50 having a top end or lid 58, a bottom end or floor 56, and an upwardly extending wall joining the top and bottom ends. In the preferred embodiment, the upwardly extending wall is comprised of two side walls 52, 54, and two end walls 48, 49 that define an interior storage area 13 (best seen in FIG. 4) to store the display 44. As is shown in FIG. 1, the top end 58, bottom end 56, side walls 52, 54, and end walls 48, 49 are joined together, with opposing side and end walls being parallel to one another. The walls therefore combine to form a rectangular box, or case 50.

While the preferred form of the case 50 is a rectangular box, any shape will suffice so long as it forms an interior space for housing the display 44 and lift 10. Thus, the case 50 could be cylindrical, triangular, pyramidal, or any other shape.

Figure 2:
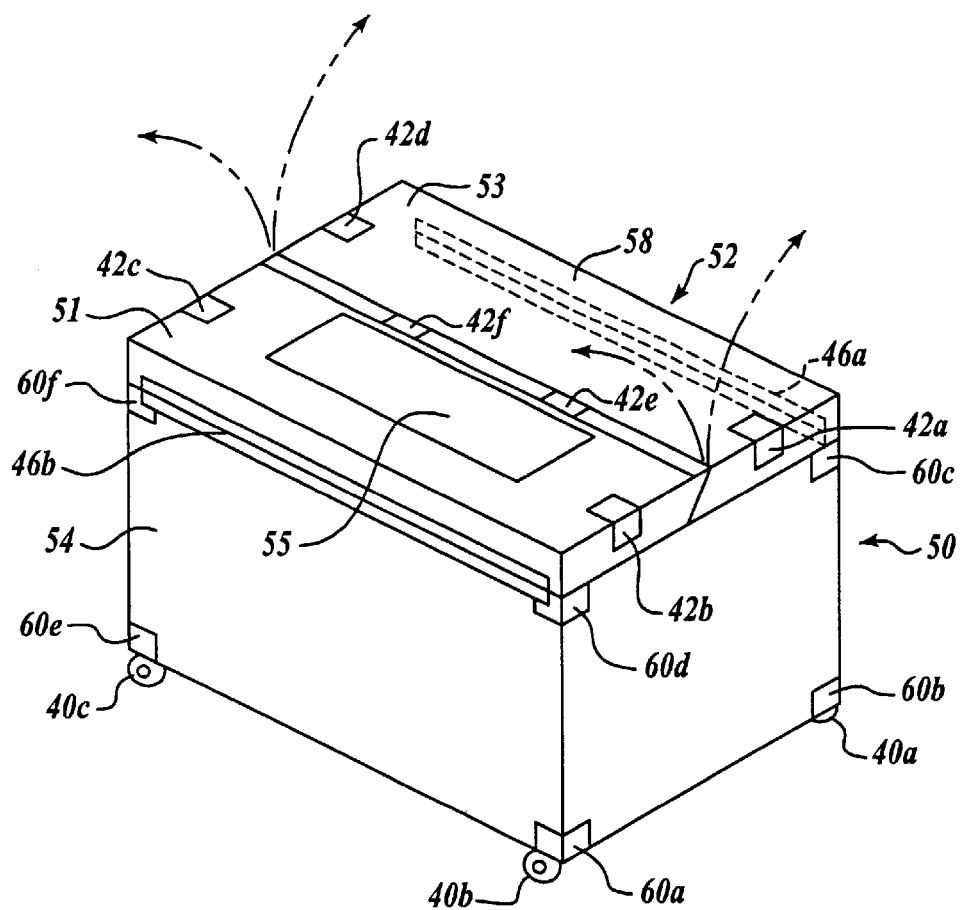
FIG. 2 is a perspective view of a display case with a stowed display screen in accordance with the present invention.

As shown in FIG. 2, the top end 58 of the case 50 is comprised of a first flap 51 and a second flap 53. Each flap 51, 53 is attached to one of the opposing side walls 54, 52 by hinges 46b, 46a. The flaps 51, 53 are movable to open and close the interior storage area 13 (best seen in FIG. 4).

Figure 4:
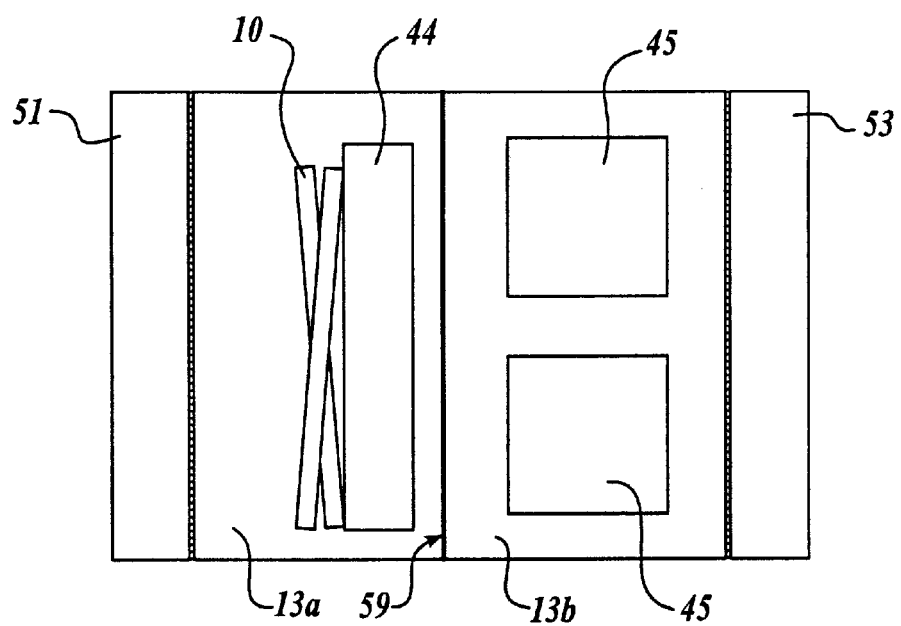
FIG. 4 is a plan view of a display case with top doors open in accordance with a preferred embodiment of the present invention.

Although the top 58 could take the form of a single lid that seals the case 50, the preferred form divides the top 58 into two flaps 51, 53 provides advantages. As shown in FIG. 4, the interior of the case 50 is divided into two compartments via an interior wall 59. The interior wall 59 is attached at opposite ends to the end walls 48, 49 and extends parallel to the side walls 52, 54. It generally divides the interior space 13, though not necessarily evenly. The interior wall 59 provides a protective barrier for the delicate viewing surface of the display 44, and creates two separate interior spaces. Preferably, the display 44 is housed on one side, leaving room for computers, video recorders, DVD players, or other equipment on the other side. The flaps 51, 53 are sized so that the display side flap 51 covers the display compartment 13a while the equipment side flap 53 covers the equipment compartment.

The display side flap 51 also includes a cutout section that retains a panel 55. The panel preferably is slidably received within the cutout using a standard tongue and groove arrangement. When the flaps 51, 53 are closed, the butt end of the equipment flap 53 prevents the panel 55 from falling out, ensuring that the case 50 is fully enclosed for storage or shipping. Other arrangements can be used to retain the panel 55, such as latches, hooks, snaps, or other fasteners.

To deploy the display 44, the panel 55 is removed, exposing the display 44. If the panel 55 and corresponding cutout are sized to allow the display to be raised, the display 44 can be raised through the display flap 51. As depicted in FIG. 1, this arrangement allows the display 44 to extend above the case 50 at a level that leaves the lift 10 generally hidden within the case. In alternate embodiments, the panel 55 and cutout are sized to accommodate the lift 10, which is preferably smaller than the display 44. Thus, as shown in FIG. 3, the lift extends through the cutout portion of the display flap 51 so that the flap 51 is closed after the display 44 is deployed for viewing. Depending on the form of the lift, the panel 55 and cutout can be large or small. In the preferred embodiment, a scissor lift is used, as discussed below. In alternate embodiments, a telescoping tube or other stand is used, providing a smaller cross-section than the scissor lift. In such embodiments, the panel 55 and cutout can be quite small.

Six latches 42a–f lock the flaps and the interior storage area during travel or when closing the case 50. In an actual embodiment, a latch locks the display flap 51 to one end wall 48, while another latch secures the display flap 51 to the opposing end wall 49. In a similar fashion, two latches lock the equipment flap 53 to the opposing end walls 48, 49. Finally, two latches releasably lock the flaps 51, 53 together. Though six latches are used in the preferred embodiment, a larger or smaller number of latches could be used to retain the flaps 51, 53 in the closed position.

The case walls are generally planar and rectangular in shape and preferably made of a lightweight material such as plastic or epoxy fiber composites. Alternatively, the case walls can be formed from solid plastic having an ABS laminate on one or both sides. To reduce weight, corrugated, honeycombed, or other such structures can be used in place of the solid plastic. While plastics such as ABS, Polyethylene, HDPE, UHMW, Nylon, or polypropylene are preferred, the walls can alternatively be constructed from plywood or other wood products or metals such as aluminum or steel. Nonetheless, there are no restrictions on materials that can be used for the case itself.

The case 50 also includes one or more ventilation openings 20 to facilitate air circulation to prevent the multimedia electronic equipment from overheating. Alternate embodiments do not use ventilation openings, particularly when the cases are not expected to house heat-generating equipment. In addition, an electrical connector 19 is provided on an exterior surface of the case 50. Within the case interior 13, one or more corresponding outlets are provided so that the display 44 or other electrical equipment may be plugged in and powered. Preferably, the internal outlets are arranged together as with a power strip. An extension cord (not shown) can be inserted into the connector 19 to provide power to the interior of the case 50.

The case includes four wheels 40a–d, one attached to each corner of the bottom 56 of the case 50. The wheels enable the case 50 to be moved easily, and are useful considering the substantial weight of the case 50 when loaded with a display and other equipment. Alternatively, the case may use castors or other rolling devices instead of wheels. Likewise, greater or fewer than four wheels may be used.

The Lift

The case 50 includes a lift assembly 10 mounted inside the case 50. As depicted in FIG. 5, the lift assembly includes a mounting bracket 100 at an upper end for attachment to the display 44. At the opposite end, the base 104 of the lift is attached to the case 50, either at the bottom of the case or at any of the side or bottom walls. The lift 10 also includes a pair of scissor arms 101, 102, and a hydraulic arm 110 for use in raising and lowering the lift. In an actual embodiment, the lift is a Plasma Gas Cylinder Lift manufactured by Chief Manufacturing, Inc. of Savage, Minn.

Other structures are possible for the lift, other than the scissor lift described above. One alternative lift is disclosed in U.S. Pat. No. 6,073,892 to Dittmer, the specification of which is incorporated by reference. The Dittmer lift and the scissor lift described above are both powered, in that the display 44 is raised electrically, hydraulically, or by some other means. The lift 10, however, need not include a powered raising and lowering mechanism, but rather can be deployed and stowed by human power.

Preferably, the lift 10 can be raised and locked in place at a variety of display heights short of full extension. Depending on the capabilities of the lift used, discrete deployment heights can be memorized so that the display 44 is quickly raised to the precise desired height.

The case 50 is not only useful for storing and shipping the display, but is also readily convertible to a display stand. When the display is raised and the flaps 51, 53 are closed, the top of the case provides a useful surface for displaying product samples, brochures, or other items. Alternatively, the top of the case can serve as a workspace for writing or using a computer.

While the preferred embodiment of the invention has been illustrated and described, many changes can be made without departing from the spirit and scope of the invention. Accordingly, the scope of the invention is not limited by the disclosure of the preferred embodiment, but rather should be determined entirely by reference to the claims that follow.

What is claimed is:

1. A case for housing a display, the case comprising:

a lid;

a floor;

an upwardly extending side wall extending between the lid and the floor to define an interior space; and a display stand attached to the case within the interior space;

wherein the lid and floor are each of a generally rectangular shape having four sides, the upwardly extending side wall comprises four generally rectangular sections, each side wall section having an upper end and a lower end, whereby each side wall section has an opposing side wall section and the interior space generally forms a rectangular cube;

and further wherein the lid comprises a first flap pivotally attached to the top end of any one of the side wall sections and a second flap pivotally attached to the top end of any one of the side wall sections; and wherein the first flap further comprises a recessed region and a panel removably attached to the recessed region.

2. The case of claim 1, further comprising an interior wall attached to at least one of the floor or side wall sections and dividing the interior space.

3. The case of claim 2, wherein the display stand is movable between a stowed position within the case and a deployed position in which the display extends at least partially outside the case.

4. The case of claim 3, wherein the display stand is extendible through the recessed region of the first flap when the display stand is in the deployed position.

5. The case of claim 3, further comprising a motor to deploy and stow the display stand.

6. The case of claim 3, further comprising a hydraulic arm to deploy and stow the display stand.

7. The case of claim 3, further comprising a means for deploying the display stand.

8. The case of claim 7, wherein the display stand is a scissor lift.

9. The case of claim 8, further comprising a plurality of wheels attached to the floor of the case.

10. The case of claim 9, further comprising a power receptacle within the interior space and attached to any of the floor, side wall sections, or interior wall, the power receptacle configured to accept an electrical plug to power the display.

11. The case of claim 10, further comprising one or more ventilation openings in at least one of the side wall sections.

12. A case for housing a display, the case comprising:

a lid;

a floor;

an upwardly extending side wall extending between the lid and the floor to define an interior space; and a display stand attached to the case within the interior space;

wherein the lid and floor are each of a generally rectangular shape having four sides, the upwardly extending side wall comprises four generally rectangular sections, each side wall section having an upper end and a lower end, whereby each side wall section has an opposing side wall section and the interior space generally forms a rectangular cube;

and further wherein the lid comprises a first flap pivotally attached to the top end of any one of the side wall sections and a second flap pivotally attached to the top end of any one of the side wall sections; and wherein the first flap further comprises a recessed region and a panel attached to the recessed region, the panel being movable to a position in which the display stand is extendible through the recessed region.

* * * * *